Jan. 30, 1934.  J. SCHUFFLER  1,945,236
SILICA BRICK
Filed June 13, 1931
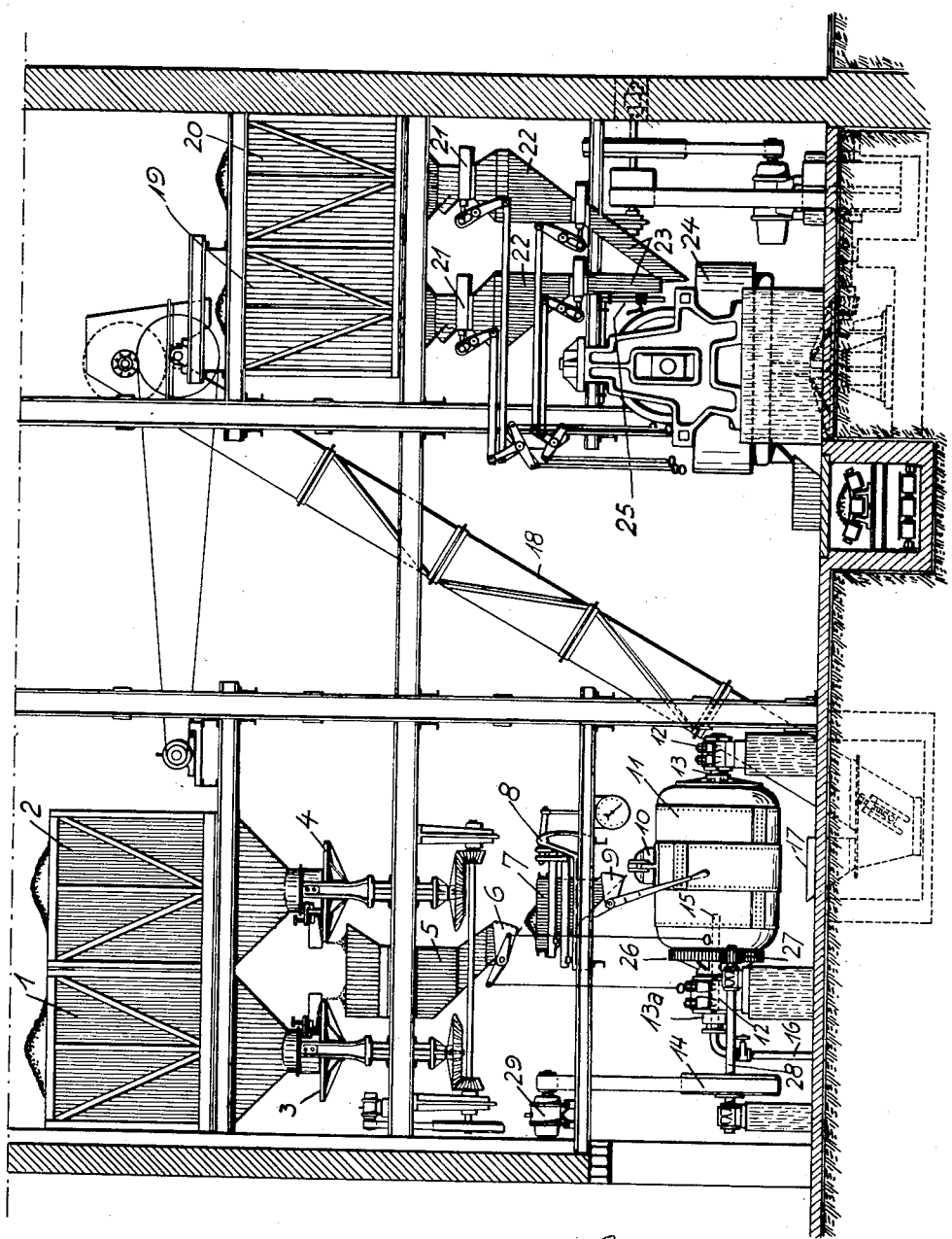
Inventor
Julius Schüffler
By Henry Love Clarke
his atty Patented Jan. 30, 1934

1,945,236

UNITED STATES PATENT OFFICE 1,945,236

SILICA BRICK

Julius Schüffler, Essen, Germany, assignor, by mesne assignments, to The Koppers Company of Delaware, Pittsburgh, Pa., a corporation of Delaware Application June 13, 1931, Serial No. 544,222, and in Germany June 14, 1930

2 Claims. (Cl. 106—24)

The invention relates to a process for the preparation of moulding masses for the manufacture of silica bricks or the like.

For the preparation of the moulding mass for the making of silica bricks it has been customary up to the present to grind and mix the quartzite and sand after the addition of slacked lime in the form of milk or slurry in a wet pan or an otherwise suitable reducing and mixing device of any desired form.

The object of the invention is a process for the production of a moulding mass for silica bricks which consists in mixing one portion of finely ground sand or quartzite with unslaked lime and treating the mixture with water at an increased temperature and possibly under an increased pressure, reducing another portion of the quartzite possibly with the addition of water and then mixing the reaction product resulting from the treatment of the silica with lime and the reduced quartzite intimately. In the place of the quartzite also sand or a mixture of sand and quartzite can be used. Furthermore, it is possible to add quartzite in large lumps to the reaction product, and to subject the mixture still to a further reducing process. According to the invention, during the slaking of the lime added to the finely ground sand steam may be led over the sand-lime mixture at ordinary or increased pressure.

Furthermore, it is according to the invention also possible to reduce (grind) the mixture of lime and quartzite (sand) during the slaking of the lime.

The process according to the invention offers the important advantage that already before the preparation of the moulding mass i. e. before the mixing of the reduced quartzite with sand and lime a reaction between the lime and the fine silica serving as a binding material takes place whereby as it was found the conversion of the quartzite during the subsequent process of burning to trydimite and cristobalite is facilitated.

On the drawing there is a side view of apparatus for carrying out the process according to this invention.

As regards the contrivances shown on the drawing the bunkers 1 and 2 serve for holding stocks of the unslaked lime and of the finely ground sand or quartzite. From these bunkers the materials indicated are carried forward by plate shaped distribution apparatus 3 and 4 or in an otherwise suitable manner in certain adjustable quantities to an intermediate bunker 5, of which the lower run-off opening can be closed by means of the valve 6. Vertically under the run-off opening of the intermediate bunker 5 the weighing holder 7 of a weigher 8 is arranged which serves to control the quantities of the raw material drawn off from the mixing bunkers.

From the weighing holder 7 the raw material can be led off by means of the run-off opening which can be closed by valves 9 into a drum 11 closed in on all sides provided with a closable filling opening, which is carried by horizontal revolving shafts 13 and 13a on the bearing blocks 12. On the reaction drum 11 outside a tooth rim 26 is fitted in the teeth of which a pinion resting on a gearing shaft 28 grips. The belt 14 of the gearing shaft is connected up for the transmission of the power with the driving motor 29.

The one drum shaft 13a is hollow. In the cavity of the shaft a tube 15 is set which closes tightly but is nevertheless revolving which serves for the introduction of water and/or steam into the drum and is connected up outside to the water and steam pipe line 16.

Below the drum 11 and within range of charging opening 10 a run-off 17 is arranged which serves to carry off the material from the drum 11 to a bucket elevator 18 by means of which the material is carried forward to an intermediate bunker 19.

Preferably in addition to the intermediate bunker 19 a storage holder 20 is provided for which serves to take the raw quartzite under the receiver 19 as well as under the receiver 20. There are provided within the range of the run-off openings 21 of the receiver 20 measuring vessels 22 from which chutes 23 lead to a wet pan 24 to which a water pipe line 25 is fitted.

The manner of working with the apparatus above described for carrying out the process according to this invention is as follows:

From the stock bunkers 1 and 2 the desired quantity of material is drawn off into the intermediate bunker 5 and after weighing charged into the reaction drum 5. Thereupon, the drum is closed and on the revolving of same through the pipe line 15 arranged in the drum carrying shaft 13a so much water and possibly steam is led into the drum as is necessary for slaking the lime added and for obtaining a mass with the desired content of water.

Meanwhile a certain quantity of raw quartzite was measured out from bunker 20 into the measuring vessel 22 and after the addition of water ground in the wet pan 24 to the required size of grain. After the completion of the grinding process a certain quantity of the reaction product is drawn off from the preparation of the sand lime mixture from the storage holder 19 into the drum 11 and likewise carried forward to the wet pan, whereupon the entire contents of the wet pan is carefully mixed. The mixture represents a moulding mass which is ready without further handling for the manufacture of silica bricks etc. Instead of using a drum for the reaction between the sand and the unslaked lime it may under certain circumstances be of advantage to carry out the invention in a completely closed ball or roller mill, whereby simultaneously with the action of the lime on the sand also a reduction of the sand takes place.

The invention as hereinabove set forth is embodied in a particular form of construction, but may be variously embodied within the scope of the claims hereinafter made.

I claim:

1. In a process of preparing a moulding mass for the manufacture of silica brick to be burned from finely ground silica and lime comprising mixing finely ground silica with lime and slaking thereof for subsequent burning of bricks from the mass, the improvement comprising: mixing only a part of the total content of finely ground silica of the ultimate bricks with unslaked lime and slaking the lime while so mixed, and thereafter mixing the reaction product resulting from such treatment with the remaining portion of the total content of finely ground silica of the ultimate bricks.

2. In a process of preparing a moulding mass for the manufacture of silica brick to be burned from finely ground silica and lime comprising mixing finely ground silica with lime and slaking thereof for subsequent burning of bricks from the mass, the improvement comprising: mixing only a part of the total content of finely ground silica of the ultimate bricks with unslaked lime and slaking the lime while so mixed, and thereafter mixing the reaction product resulting from such treatment with the remaining portion of the total content of finely ground silica of the ultimate bricks, the latter portion being free of substantial amounts of lime when mixed with the product of said treatment, and substantially all slaked lime required for all of the finely ground silica aforesaid being brought into the mixture as aforesaid.

JULIUS SCHÜFFLER.